United States Patent [19]
Quartarone

[11] Patent Number: 5,396,811
[45] Date of Patent: Mar. 14, 1995

[54] FLUID DYNAMOMETER HAVING FLUID CHARACTERISTIC POWER ABSORPTION ADJUSTMENT CAPABILITY

[75] Inventor: James R. Quartarone, Newport, R.I.

[73] Assignee: The United States of America as represented by the Secretary of the Navy, Washington, D.C.

[21] Appl. No.: 37,880

[22] Filed: Mar. 29, 1993

[51] Int. Cl.[6] .................... G01L 3/20; G01M 15/00
[52] U.S. Cl. ............................................... 73/862.14
[58] Field of Search ............... 73/116, 862.14, 862.16

[56] References Cited

U.S. PATENT DOCUMENTS

| | | | |
|---|---|---|---|
| 2,597,450 | 5/1952 | Cline | 73/862.14 |
| 2,603,968 | 7/1952 | Cline | 73/862.14 |
| 2,672,953 | 3/1954 | Cline | 73/862.14 |
| 2,981,099 | 4/1961 | Lapp | 73/862.14 |
| 3,091,309 | 5/1963 | Sheldon | 73/862.14 |
| 3,115,034 | 12/1963 | De Hart | 73/862.14 |
| 3,138,018 | 6/1964 | Pohl | 73/862.14 |
| 3,298,224 | 1/1967 | Birchall et al. | 73/862.14 |
| 3,851,524 | 12/1974 | Liu | 73/862.16 |
| 3,938,377 | 2/1976 | Converse, III et al. | 73/862.14 |

FOREIGN PATENT DOCUMENTS 9113330  9/1991  WIPO ............... 73/862.14

Primary Examiner—Richard E. Chilcot, Jr.
Assistant Examiner—George M. Dombroske
Attorney, Agent, or Firm—Michael J. McGowan; Prithvi C. Lall; Michael F. Oglo

[57] ABSTRACT

A fluid dynamometer is provided for absorbing a range of power output produced by an engine's rotating shaft. Power absorbing characteristics are controlled by adjusting the fluid media characteristics in terms of its temperature and/or its density and viscosity. A tank, containing an energy or power absorbing fluid, receives the rotating shaft. One or more disks, submerged in the fluid and coaxially mounted on the rotating shaft for rotation therewith, cooperate with the fluid to absorb power from the rotating shaft. The disk(s) are sized so that a first specified amount of power from the rotating shaft is absorbed at a calibration temperature of the fluid. Heating and cooling units are provided to respectively heat and cool the fluid. A controller energizes the heating and cooling units in a cooperative fashion to adjust and maintain the fluid at a predetermined temperature value for power absorption at a second specified amount of power produced by the rotating shaft. A fluid composition exchanger may also be provided to alter the power absorbing characteristics by altering the fluid's composition.

5 Claims, 3 Drawing Sheets

FLUID DYNAMOMETER HAVING FLUID CHARACTERISTIC POWER ABSORPTION ADJUSTMENT CAPABILITY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Field of the Invention

The present invention relates generally to fluid dynamometers, and more particularly to a fluid dynamometer that adjusts the characteristics of the fluid contained therein to thereby adjust the power absorbing characteristics of the dynamometer.

2. Description of the Prior Art

Dynamometers are devices which are used to measure and absorb the power output of engines or power producing devices. This output is usually transmitted by a rotating shaft to the dynamometer. There are two basic types of dynamometers, a brake dynamometer and a disk dynamometer. In a brake type dynamometer a frictional load is imposed upon the rotating shaft to absorb the energy produced. The amount of force needed to impose the frictional load is equatable to the power being produced by the engine.

In a disk dynamometer, a disk is affixed to the rotating shaft of the engine. The disk is submerged in a container of fluid, typically tap or fresh water. The power produced by the engine is absorbed by the well known interaction of the disk and fluid at the disk/fluid interface. In this type of dynamometer, there often are no physical or mechanical measurements of torque or force caused by the rotating shaft. Rather, the disk is calibrated to absorb a specified amount of power in fresh water at 68° F. for a prescribed number of shaft revolutions per minute (RPM). In this way, one may determine power or energy output of the engine by measuring shaft RPM.

In addition to single disk dynamometers, there are multiple disk and counter-rotating disk dynamometers. For multiple disk type dynamometers, the dynamometer tank housing usually includes a number of projections interspersed between the rotating disks to assure that a cylindrical water slug is not formed about the rotating components. The formation of a water slug would destroy or cause a variation in the known power absorption characteristic of the disk assembly. The counter-rotating disk type dynamometer is used to measure total engine power output when the engine has two power output shafts which rotate in different directions.

For single or multiple disk dynamometers, the equation relating a disk's size, shaft rotational speed and horsepower is usually in the form:

$$HP = 1.78 \times 10^{-11} C R^{4.6} \rho \nu^{1/5} \omega^{2.8}$$

where HP is the shaft horsepower;
$\rho$ is the density of the fluid in slugs/ft$^3$;
C is a dimensionless constant verified by a horsepower calculation that uses shaft torque and angular velocity measurements;
$\nu$ is the kinematic viscosity of the fluid media in ft$^2$/sec;
R is the disk radius in inches; and
$\omega$ is the angular velocity of the disk in revolutions per minute (RPM). For multiple and counter-rotating disk dynamometers, the horsepower equation is evaluated for each of the disks.

From the foregoing relation, it can be seen that to absorb a different amount of power at a given rotational speed under standard test conditions (i.e., water at 68° F.), the disk radius is the only parameter which can be modified. Modification of the "C" parameter, or constant, is not considered because it relates primarily to the dynamometer tank geometry. The standard practice is to optimally size the disk's diameter to absorb the power output of the engine being tested. Therefore, it is necessary to have a number of disks available, each uniquely suited to absorb a specified engine output as a function of rotational speed. If the disks available are unsuited to absorb the specified power, an additional disk must be made, or an existing disk modified for the application. Providing additional disks and/or modifying existing disks is both costly and time consuming. Another method of adjusting the load is to partially fill the tank or vary the amount of water in the tank. However, drawing fluid from the tank results in an air-water interface that produces system oscillations, unsteady conditions and noise.

SUMMARY OF THE INVENTION

Accordingly, it is an object of the present invention to provide a fluid dynamometer that can absorb power output of a rotating shaft for a range of shaft power outputs.

Another object of the present invention is to provide a fluid disk dynamometer that absorbs a range of power output from one or more rotating shafts without modification of the disk(s).

Still another object of the present invention is to provide a fluid disk dynamometer whose operating principles are applicable to single, multiple and counter-rotating disk dynamometers.

Yet another object of the present invention is to provide a fluid dynamometer that minimizes operational vibration and noise while absorbing a range of power output from one or more rotating shafts.

Other objects and advantages of the present invention will become more obvious hereinafter in the specification and drawings.

In accordance with the present invention, a fluid dynamometer is provided for absorbing a range of power output produced by an engine's rotating shaft. Power absorbing characteristics are controlled by adjusting the fluid media characteristics in terms of its temperature and/or its density and viscosity. A tank, containing a power absorbing fluid (e.g., water), receives the rotating shaft therein. At least one disk, submerged in the fluid and coaxially mounted on the rotating shaft for rotation therewith, cooperates with the fluid to absorb power from the rotating shaft. The disk(s) are sized to absorb a first specified amount of power from the rotating shaft at a calibration temperature of the fluid. Heating and cooling units are provided to respectively heat and cool the fluid. A controller energizes the heating and cooling units in a cooperative fashion to adjust and maintain the fluid at a predetermined temperature value for power absorption at a second specified amount of power produced by the rotating shaft. A fluid composition exchanger may also be provided to alter the power absorbing characteristics by altering the fluid's composition.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1A:
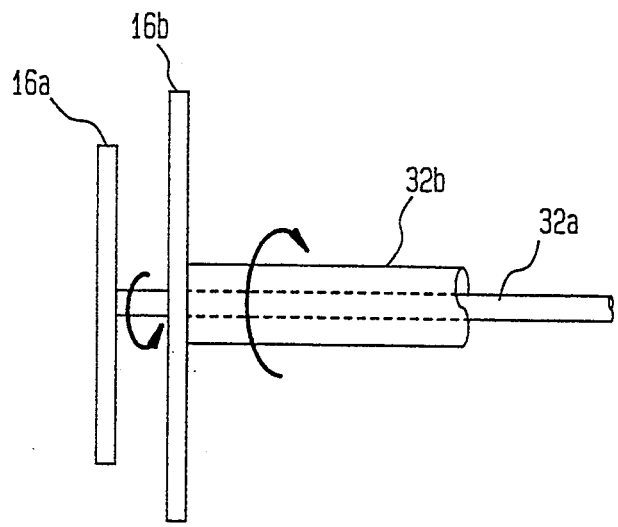
FIG. 1A is an isolated view of a counter-rotating disk arrangement.
Figure 1:
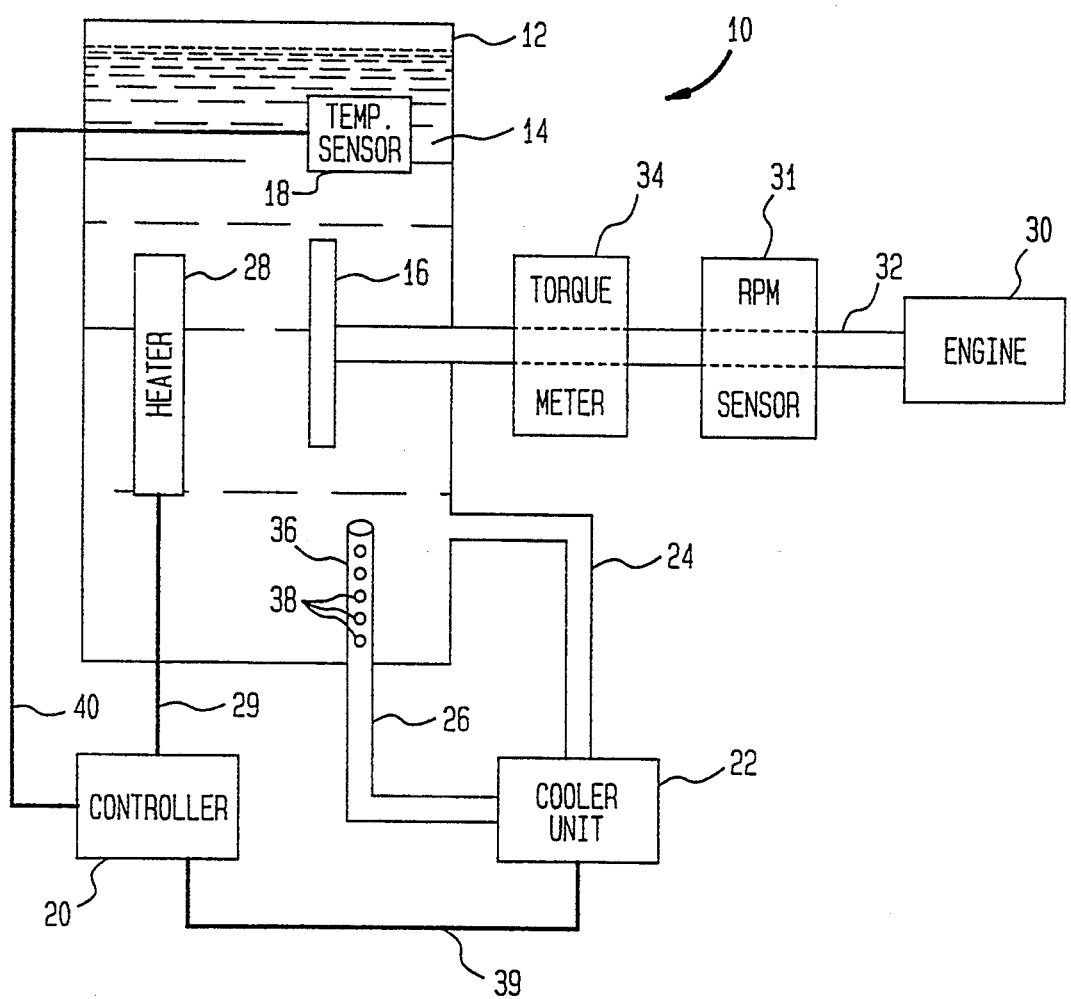
FIG. 1 is a schematic view of the fluid dynamometer according to the present invention.

Referring now to the drawings, and more particularly to FIG. 1, a schematic view is shown of a disk dynamometer 10 according to a preferred embodiment of the present invention. An engine 30 and dynamometer 10 are connected by means of shaft 32. A disk 16 is connected to, and rotates with, shaft 32. An RPM sensor 31 may be provided to measure the angular velocity of shaft 32 in revolutions per minute. Alternatively, torque could be sensed and measured by a torque meter 34. While illustrated for a single disk, the dynamometer of the present invention may use multiple disks or counter-rotating disks. By way of example, a counter-rotating disk arrangement is shown in the isolated view of FIG. 1A. Disk 16a rotates with inner shaft 32a in one direction while disk 16b rotates with outer shaft 32b in the opposite direction. Accordingly, while the singular "disk" will be referred to throughout the description, it will be well understood by one of ordinary skill in the art that the present invention applies equally as well to a multiple and/or counter-rotating disk dynamometer having substantially the same or different diameter disks.

Disk 16 is located in dynamometer tank 12 and submerged in a power absorbing fluid 14 that preferably fills, or alternatively substantially fills, tank 12 as shown. Power absorbing fluid 14 may be fresh water, salt water (3.5% salt), salt water with higher or lower salt concentrations, an ethylene glycol/water mixture (e.g., a 50/50 mix), mineral or synthetic oil, glycerine, silicon fluid, or any other fluid which has a known temperature versus density and kinematic viscosity relationship that does not act discontinuously about a given temperature. Continuity between temperature and density and kinematic viscosity means that there must be no discontinuities due to change in state or similar phenomena (e.g., aeration of liquid, water to ice, boiling, freezing, colloidal mix to separation, evaporation of one component from a mixture). The relationship between temperature (T) and density ($\rho$), and the relationship between temperature and kinematic viscosity ($\nu$), must be continuous so that the relationship between T and $\rho\nu^{1/5}$ is continuous. Values in a continuous (and one on one) relationship can be interpolated over the range of temperatures in question.

The temperature of power absorbing fluid 14 is continually sensed by a fluid temperature sensor 18 which provides an input over line 40 to a controller 20. Controller 20, over lines 29 and 39, respectively, regulates a heater 28 and a cooler unit 22 to maintain the temperature of power absorbing fluid 14 at a predetermined value. Accordingly, controller 20 might be a personal computer that receives temperature inputs in order to output control signals in accordance with the inputs. The output of controller 20 could be the result of a preprogrammed condition response or an operator response.

Dynamometer 10 adjusts the temperature of power absorbing fluid 14 such that the fluid, in conjunction with disk 16, will absorb a range of power output of engine 30. This is in contrast to prior art dynamometers where a specific disk diameter is selected to absorb a specific power output at a calibration temperature.

Cooler unit 22 is connected to the dynamometer tank 12 by a discharge pipe 26 and a suction pipe 24. Discharge pipe 26 is connected to a tank inlet distribution line 36. To facilitate an even distribution of the cooled fluid, distribution line 36 may be a porous tube as indicated by holes 38. When the temperature of power absorbing fluid 14 is higher than the predetermined temperature, controller 20 directs cooler unit 22 to remove fluid 14 from dynamometer tank 12 through suction pipe 24, pass it through cooler unit 22 to remove heat energy and return the cooled fluid 14 back to tank 12 via discharge pipe 26 and distribution line 36. Cooler unit 22 may be any device, apparatus or combination of devices known in the art which can remove fluid from a tank or container, cool it and then return the cooled fluid back to the tank or container.

Shown inside tank 12 is a heater 28 which is selectively energized by controller 20 to heat fluid 14 when the temperature of fluid 14 falls below the predetermined temperature. Heater 28 may comprise any device known in the art that may be selectively turned on or off to heat a fluid in a tank. Accordingly, heater 28 may comprise a strip heater that is submerged in fluid 14 as shown. Additional strip heaters (not shown) may be provided as needed. Alternatively, the fluid heating apparatus of choice could be located outside the tank and in a heat transfer relationship with the fluid (e.g., a device analogous to cooler unit 22 which can remove fluid from the tank, heat the fluid and return the heated fluid to the tank).

Owing to the turbulence created in fluid 14 by the rotation of disk 16 as shaft 32 rotates, placement of temperature sensor 18, heater 28 and distribution line 36 is generally not critical to operation of the present invention. It is only necessary that these elements not be placed in dead zones (i.e., where mixing is insignificant) within tank 12.

In operation, the optimal disk size is selected based on a specified power output to be absorbed and the assumption that power absorbing fluid 14 is a power absorbing fluid with a known density and kinematic viscosity at a calibration temperature, e.g., fresh water maintained at 68° F. Using known density and kinematic viscosity properties of different fluids at different temperatures, one can determine which fluid and at what fluid temperature a selected disk will act as if it was optimally sized. The dynamometer is then configured to use the required fluid and to control the fluid temperature so the installed disk will be optimal for power absorption over the range of temperatures yielding the desired power adjustment capability. This involves temperature dependent relationships of density, kinematic viscosity and a power absorption multiplier. The power absorption multiplier represents the change in fluid density and kinematic viscosity at a given temperature versus the fluid density and kinematic viscosity in fresh water at 68° F. Table 1 is presented as an exemplary table of these relationships for fresh water. Such data is available from a variety of public domain sources such as "Fluid Mechanics With Engineering Applications" by Daugherty and Franzini, McGraw-Hill Book Co, New York.

TABLE 1

POWER ABSORPTION AS A FUNCTION OF FLUID TEMPERATURE FOR FRESH WATER

| TEMPERATURE (T) °F. | DENSITY ($\rho$) SLUG/FT$^3$ | KINEMATIC VISCOSITY ($\nu$) FT$^2$/SEC | POWER ABSORPTION FACTOR ($\rho\nu^{1/5}$) | NORMALIZED POWER ABSORPTION MULTIPLIER $\frac{(\rho\nu^{1/5})}{(\rho_0\nu_0^{1/5})}$ |
|---|---|---|---|---|
| 40 | 1.940 | 0.00001664 | 0.21479907 | 1.092 |
| 50 | 1.940 | 0.00001410 | 0.20780000 | 1.056 |
| 60 | 1.938 | 0.00001217 | 0.20156350 | 1.025 |
| 68 | 1.9367 | 0.00001080 | 0.19668864 | 1.000 |
| 70 | 1.936 | 0.00001059 | 0.19583240 | 0.996 |
| 80 | 1.934 | 0.00000930 | 0.19061324 | 0.969 |
| 90 | 1.931 | 0.00000826 | 0.18585673 | 0.945 |
| 100 | 1.927 | 0.00000739 | 0.18138886 | 0.922 |
| 110 | 1.923 | 0.00000667 | 0.17733908 | 0.902 |
| 120 | 1.918 | 0.00000609 | 0.17368890 | 0.883 |
| 130 | 1.913 | 0.00000558 | 0.17023224 | 0.865 |
| 140 | 1.908 | 0.00000514 | 0.16702097 | 0.849 |

Figure 2:
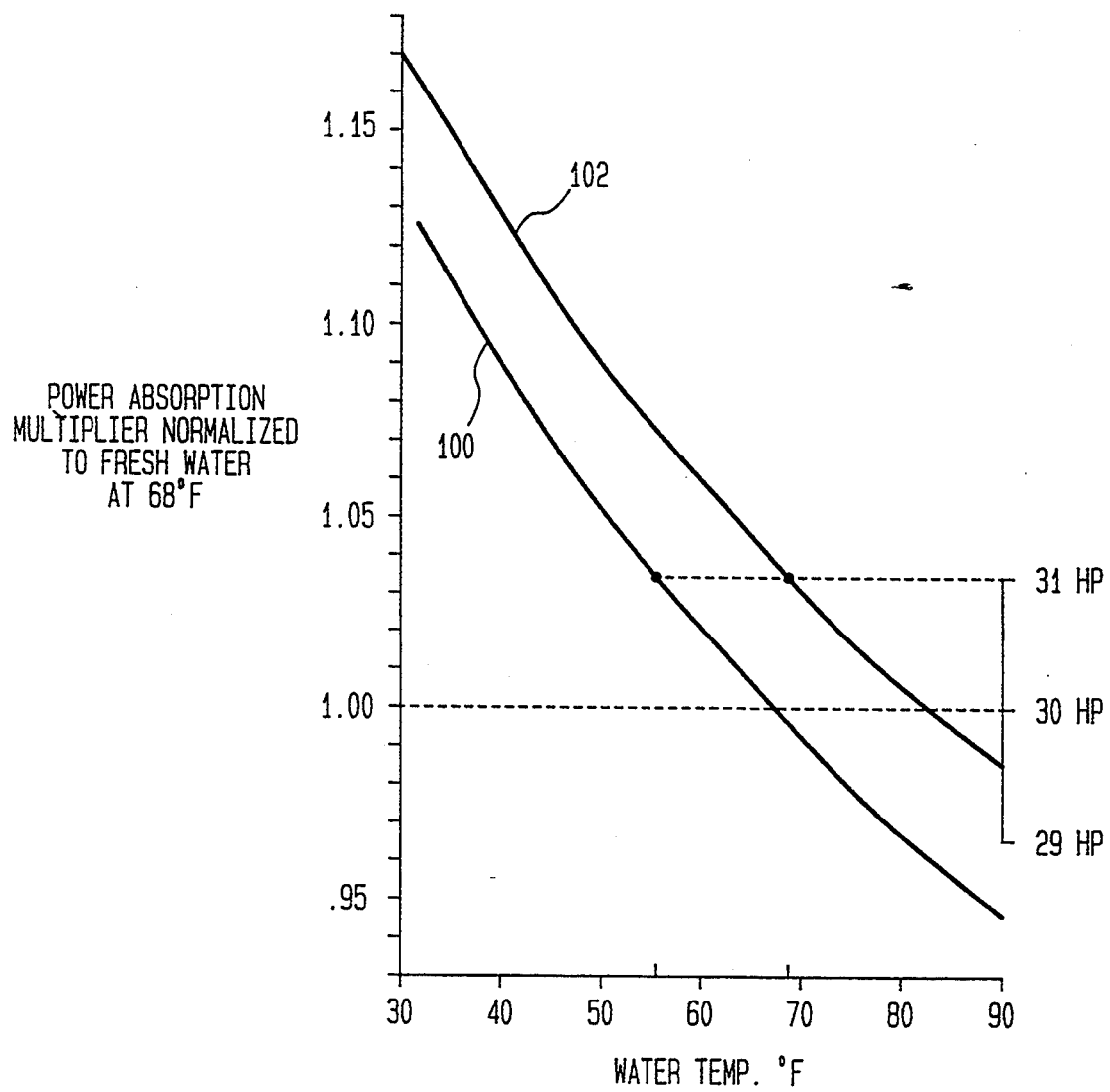
FIG. 2 is a graph of the variation of the power absorption multiplier as a function of temperature for a representative example that makes use of the present invention.

There is shown in FIG. 2 a graph of the variation of the power absorption multiplier as a function of temperature for a 25.598" diameter disk rotating at 933.3 rpm in fresh water, curve 100, and salt water (3.5% salt), curve 102. From this graph, it can be seen how the power absorption characteristics of the present invention can be varied by modifying the power absorbing fluid and/or the power absorbing fluid temperature. Curves 100 and 102 may easily be verified by calculating horsepower based on the shaft's angular velocity as measured by RPM sensor 31 and torque as measured by torque meter 34.

The adjustability of the power absorbing characteristic for the present invention can be seen from the following example with reference to FIG. 2. FIG. 2 shows that a disk measuring 25.598" in diameter is optimally sized to absorb 30 HP from a shaft rotating at 933.3 rpm in fresh water at 68° F. If this same disk were now required to absorb 31 HP at 933.3 rpm, fluid 14 could remain as fresh water and have its temperature lowered to approximately 56° F. Alternatively, fluid 14 could be salt water with a temperature of approximately 68° F.

Figure 3:
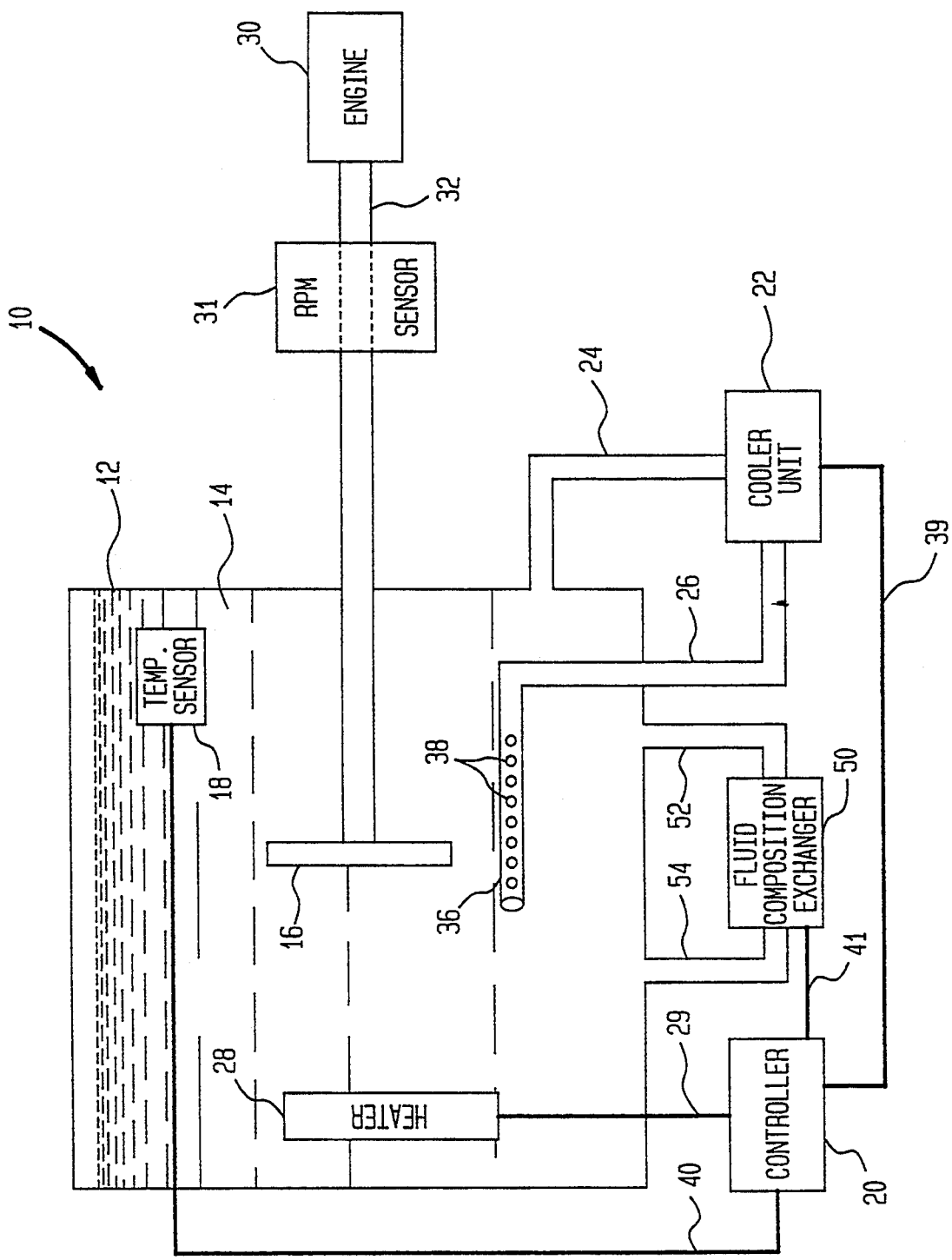
FIG. 3 is a schematic view of an alternative embodiment of the fluid dynamometer according to the present invention.

While the present invention has been described for the assumption that tank 12 is a closed system with respect to the power absorbing fluid's composition, this need not be the case. Further system flexibility may be obtained by providing dynamometer 10 with a fluid composition exchanger 50 as shown in FIG. 3 where like reference numerals have been used for those elements common with FIG. 1. Exchanger 50, controlled by controller 20 over line 41, may continuously receive a flow of power absorbing fluid 14 via suction pipe 52. Fluid 14 passes through exchanger 50 where its composition may be altered over time to yield a fluid 14 having a different known density and kinematic viscosity. The altered fluid is pumped back into tank 12 via discharge tube 54. For example, if power absorbing fluid 14 is water, exchanger 50 may serve to increase or decrease salinity (or change the fluid mixture composition in the case of a water/ethylene glycol mixture) of fluid 14 as it passes therethrough.

The advantages of the present invention are numerous. The dynamometer of the present invention can be adjusted to absorb a range of power being produced by an engine. The dynamometer's disk is calibrated with a given composition fluid to absorb a specified power at a calibration temperature. Rather than requiring a multitude of disk sizes and the laborious task of disk selection/modification, the present invention need only change the power absorbing fluid composition and/or its temperature. In this way, the present invention adapts to a variety of fluids and temperatures and, further, allows one to alter the fluid and fluid temperature to effectively modify the disk for a given application. Further, by maintaining a filled or substantially filled tank, vibration and noise is minimized since no air-water interface is created in the tank.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A fluid dynamometer for absorbing a range of output power produced by an engine's rotating shaft, comprising:

a fluid;

tank means containing said fluid and receiving the rotating shaft therein;

disk means, submerged in said fluid and fixably mounted on the rotating shaft for rotation therewith, for cooperating with said fluid to absorb power produced by the rotating shaft, said disk means sized to absorb a first specified amount of power from the rotating shaft at a first specified temperature of said fluid;

means for heating said fluid;

means for cooling said fluid;

means for simultaneously controlling said heating and cooling means to adjust and maintain said fluid at a predetermined temperature value for power absorption at a second specified amount of power produced by the rotating shaft; and means for altering the chemical composition of said fluid.

2. A fluid dynamometer for absorbing a range of output power produced by an engine's rotating shaft, comprising:
- a fluid, said fluid being selected from the group consisting generally of fresh water, salt water, a water-/ethylene glycol mixture, mineral oil, synthetic oil, glycerine and liquid silicon, said fluid being salt water:
- tank means containing said fluid and receiving the rotating shaft therein;
- disk means, submerged in said fluid and fixably mounted on the rotating shaft for rotation therewith, for cooperating with said fluid to absorb power produced by the rotating shaft, said disk means sized to absorb a first specified amount of power from the rotating shaft at a first specified temperature of said fluid;
- means for heating said fluid;
- means for cooling said fluid;
- means for simultaneously controlling said heating and cooling means to adjust and maintain said fluid at a predetermined temperature value for power absorption at a second specified amount of power produced by the rotating shaft; and
- means for adjusting the salinity of said salt water.

3. A fluid dynamometer for absorbing a range of output power produced by an engine's rotating shaft, comprising:
- a fluid, said fluid being selected from the group consisting generally of fresh Water, salt water, a water-/ethylene glycol mixture, mineral oil, synthetic oil, glycerine and liquid silicon, said fluid being the foregoing water/ethylene glycol mixture;
- tank means containing said fluid and receiving the rotating shaft therein;
- disk means, submerged in said fluid and fixably mounted on the rotating shaft for rotation therewith, for cooperating with said fluid to absorb power produced by the rotating shaft, said disk means sized to absorb a first specified amount of power from the rotating shaft at a first specified temperature of said fluid;
- means for heating said fluid;
- means for cooling said fluid;
- means for simultaneously controlling said heating and cooling means to adjust and maintain said fluid at a predetermined temperature value for power absorption at a second specified amount of power produced by the rotating shaft; and
- means for adjusting percentages of water and ethylene glycol.

4. A fluid dynamometer for absorbing a range of output power produced by an engine's rotating shaft, comprising:
- tank means containing water and receiving the rotating shaft therein, said water being salt water;
- at least one disk, submerged in said water and coaxially mounted on the rotating shaft for rotation therewith, for cooperating with said water to absorb power produced by the rotating shaft, said at least one disk sized to absorb a first specified amount of power from the rotating shaft at a calibration temperature of said water;
- means for heating said water;
- means for cooling said water; and
- means for simultaneously controlling said heating and cooling means to adjust and maintain said water at a predetermined temperature value for power absorption at a second specified amount of power produced by the rotating shaft.

5. A fluid dynamometer for absorbing a range of output power produced by an engine's rotating shaft, comprising:
- tank means containing water and receiving the rotating shaft therein;
- at least one disk, submerged in said water and coaxially mounted on the rotating shaft for rotation therewith, for cooperating with said water to absorb power produced by the rotating shaft, said at least one disk sized to absorb a first specified amount of power from the rotating shaft at a calibration temperature of said water;
- means for heating said water;
- means for cooling said water;
- means for simultaneously controlling said heating and cooling means to adjust and maintain said water at a predetermined temperature value for power absorption at a second specified amount of power produced by the rotating shaft; and
- means for altering the chemical composition of said water.

* * * * *